(12) United States Patent
Francini et al.

(10) Patent No.: US 8,340,105 B2
(45) Date of Patent: Dec. 25, 2012

(54) COORDINATION INDEPENDENT RATE ADAPTATION DEPLOYMENT METHODS AND SYSTEMS

(75) Inventors: Andrea Francini, Mooresville, NC (US); Dimitrios Stiliadis, Morganville, NJ (US)

(73) Assignee: Alcatel Lucent, Paris (FR)

( * ) Notice: Subject to any disclaimer, the term of this patent is extended or adjusted under 35 U.S.C. 154(b) by 387 days.

(21) Appl. No.: 12/642,314

(22) Filed: Dec. 18, 2009

(65) Prior Publication Data

US 2011/0149995 A1 Jun. 23, 2011

(51) Int. Cl.
*H04L 12/28* (2006.01)
*H04J 3/16* (2006.01)
(52) U.S. Cl. .......................... 370/400; 370/465
(58) Field of Classification Search .................. 370/230, 370/235, 252, 400, 465
See application file for complete search history.

(56) References Cited

U.S. PATENT DOCUMENTS

| | | | |
|---|---|---|---|
| 6,233,241 B1 * | 5/2001 | Trossen et al. | 370/408 |
| 7,826,454 B2 * | 11/2010 | Polk et al. | 370/392 |
| 2001/0047395 A1 * | 11/2001 | Szutu | 709/217 |

OTHER PUBLICATIONS

Andrea Francini et al. Performance bounds of rate-adaptation schemes for energy-efficient routers, 2010 International Conference on High Performance Switching and Routing, Jun. 13, 2010, pp. 175-182.
A. Francini, D. Stiliadis, Rate adaptation for energy efficiency in packet networks, Bell Labs Technical Journal, vol. 15 No. 2, Aug. 23, 2010, p. 131-136.
Gupta M et al., Greening of the Internet, Computer Communication Review, ACM, New York, NY, US, vol. 33 No. 4 Oct. 1, 2033. APges. 19-26.
Yan Luo et al. Low power network processor design using clock gating, Design Automation Conference, Jun. 13, 2005, pp. 712-715.
Jia U et al., Assertion-Based Design Exploration of DVA in Network Processor Architectures, Automation and Test in Europe, Mar. 7, 2005, pp. 92-97.
Snowdon, "Power Management and Dynamic Voltage Scaling: Myths and Facts", National ICT Australia and School of Computer Science and Engineering, 12:52:45, 2005, pp. 1-7.
Zafer, "A Calculus Approach to Energy-Efficient Data Transmission With Quality-of-Service Constraints", IEEE/ACM Transactions on Networking, vol. 17, No. 3, 2009, pp. 898-911.
Burd, "A Dynamic Voltage Scaled Microprocessor System", IEEE Journal of Solid-State Circuits, vol. 35, No. 11, 2000, pp. 1571-1580.
Barroso, "The Case for Energy-Proportional Computing", IEEE Computer Society, 2007, pp. 33-37.
Zhai, "The Limit of Dynamic Voltage Scaling and Insomniac Dynamic Voltage Scaling", IEEE Transactions on Very Large Scale Integration (VLSI) Systems, vol. 13, No. 11, 2005, pp. 1239-1252.

(Continued)

*Primary Examiner* — Andrew Lee
(74) *Attorney, Agent, or Firm* — Kramer & Amado, P.C.

(57) ABSTRACT

A method and system of coordination independent rate adaptation is disclosed. The method and system of coordination independent rate adaptation provides for deploying a rate adaptation subdomain into a packet network having no rate adaptation coordination among the network nodes. The method and system is particularly useful for incremental introduction of rate-adaptive devices in existing networks; combining the best properties of sleep-state exploitation and rate scaling techniques by defining a class of state-setting policies for rate adaptation schemes that enforce tight deterministic bounds on the extra delay that the schemes may cause to network traffic at every node where they are deployed.

20 Claims, 12 Drawing Sheets

OTHER PUBLICATIONS

Nedevschi, "Reducing Network Energy Consumption via Sleeping and Rate-Adaptation", NSDI '08: 5th USENIX Symposium on Networked Systems Design and Implementation, pp. 323-336.

Mandviwalla, "Energy-Efficient Scheme for Multiprocessor-Based Router Linecards", Center for Advanced Computer Studies, University of Louisiana at Lafayette, Proceedings of the 2005 Symposium on Applications and the Internet, pages.

* cited by examiner

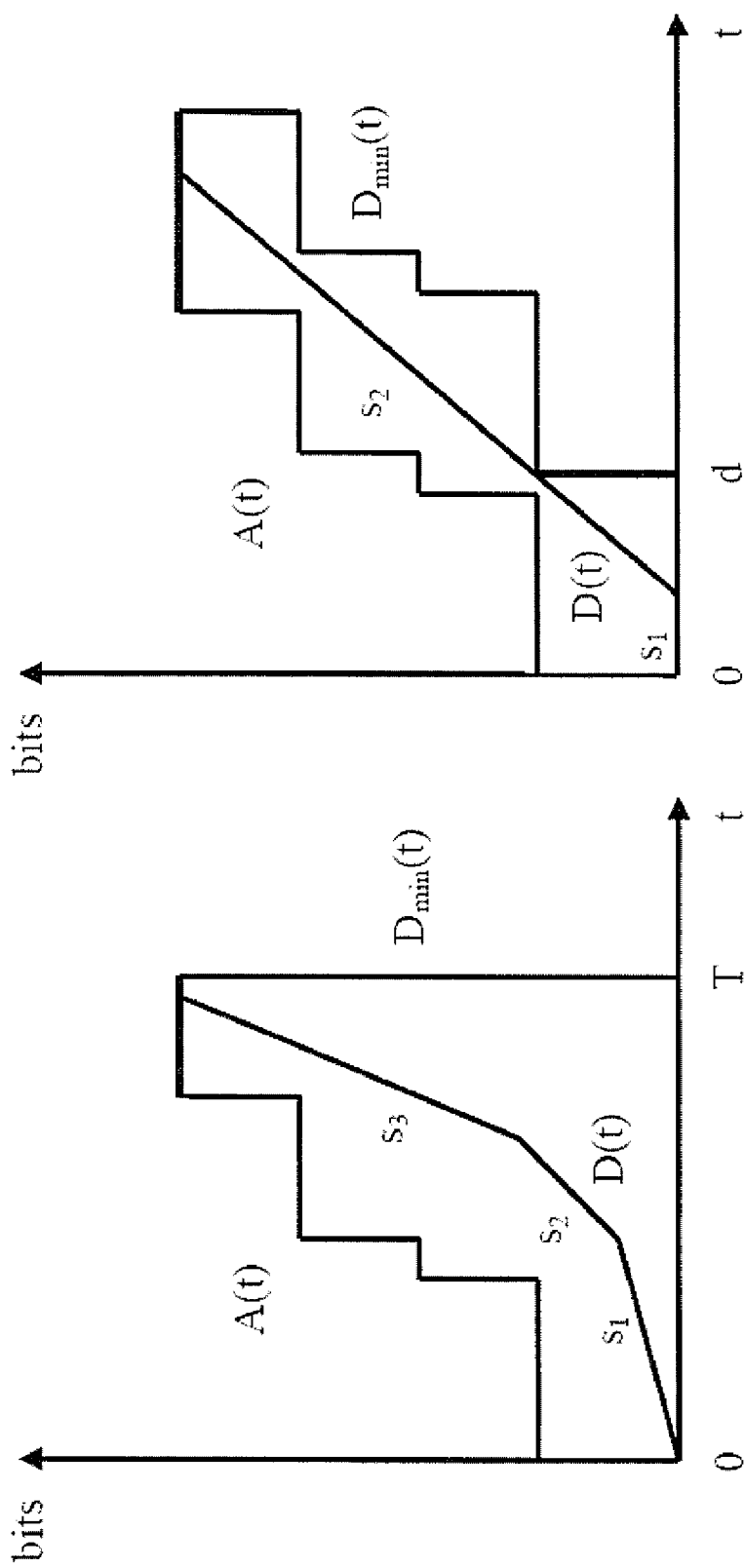

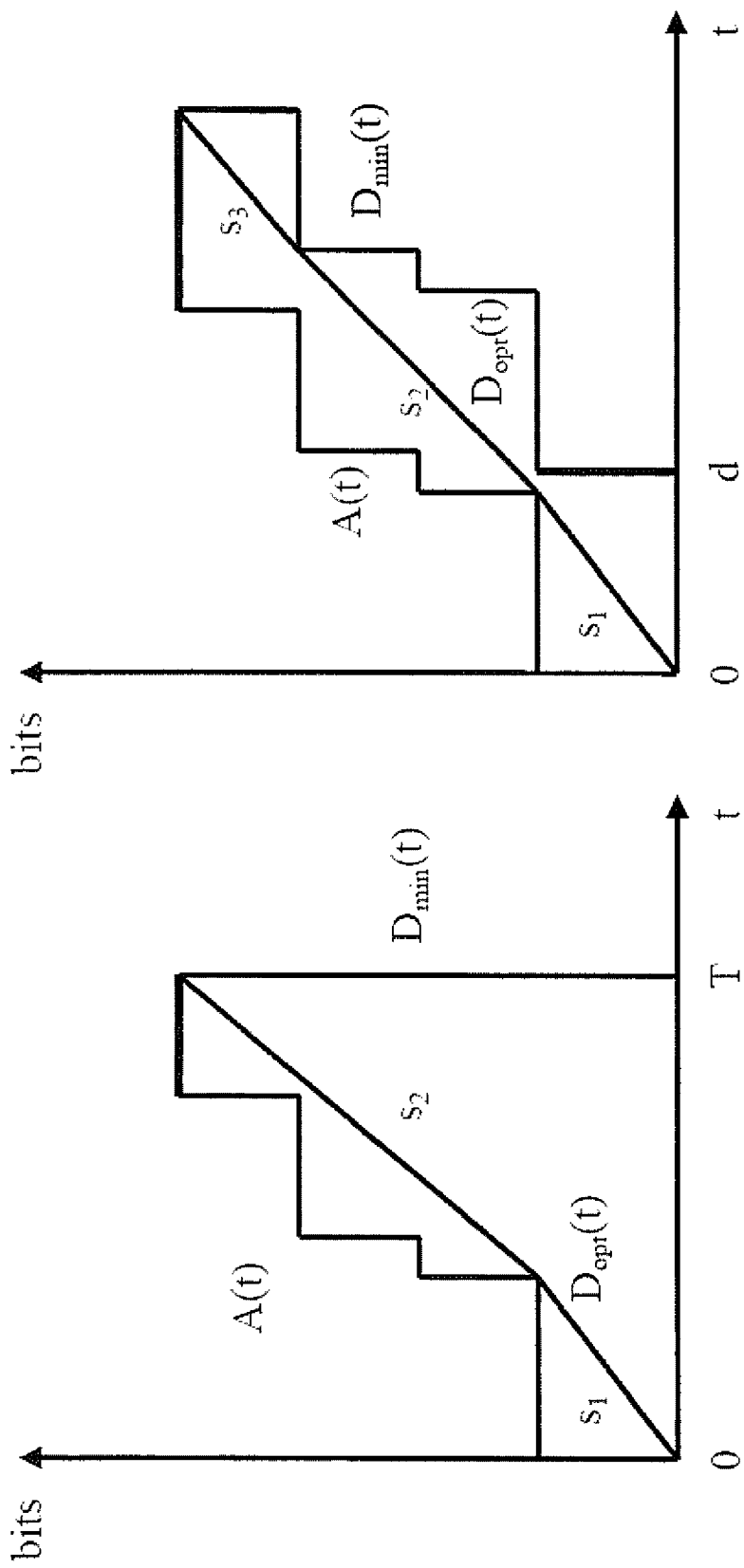

COORDINATION INDEPENDENT RATE ADAPTATION DEPLOYMENT METHODS AND SYSTEMS

FIELD OF THE INVENTION

The invention relates to energy efficiency with rate adaptation and is particularly concerned with rate-adaptation schemes that combine the best properties of sleep-state exploitation and rate-scaling techniques.

BACKGROUND OF THE INVENTION

Data networking services and applications enable substantial energy savings in broad sectors of economic activity, for example by replacing the transportation of people and goods with the electronic transfer of data packets. In order to maximize the energy-saving yields of the replacement function offered by network services and applications, packet networks themselves must target energy efficiency comprehensively, in every component and in every function. Energy efficiency thus becomes an attribute of foremost importance in the design and qualification of network equipment.

Network nodes forward data packets from one network interface to another, often modifying part of their contents. To minimize energy consumption, energy use in network equipment should be proportional to traffic handling activity. More specifically, energy use in a system should scale with the network traffic load and should become negligible when the system does not process packets.

Rate scaling and sleep-state exploitation are popular methods for reducing energy consumption in network nodes when traffic load is well below link capacity. (For reference, in this disclosure the terms rate scaling and sleep-state exploitation as referred to as examples of rate adaptation.)

With rate scaling, the clock frequency of the data-path device changes over time to track the traffic load, using the generally linear relationship that exists between frequency and power to decrease power consumption levels under low traffic loads. However, since the traffic processing rate also scales with the operating frequency, delay accumulation may be caused by frequency reductions. To control delay accumulation, the operation of rate-scaling systems is typically constrained by bounds on the additional delay that lower processing rates can impose on traffic. Steeper reductions of power consumption levels can be obtained by integration of dynamic voltage and frequency scaling (DVFS) technologies in the rate-scaling system. In a DVFS device, the voltage level of the power supply can decrease as the clock frequency scales down, at least down to the minimum voltage level needed to maintain the electronic circuitry of the device in predictable operation.

With sleep-state exploitation, the network device alternates between a full-capacity state where it operates at maximum clock frequency as long as traffic is available for processing and a sleep state where power consumption is much lower.

While a significant body of work can be found in the literature that defines and studies rate-scaling and sleep-state exploitation schemes and architectures, several issues remain unresolved.

First, a clear framework for the coordination of contiguous rate-adaptation devices is not yet available. For sleep-state exploitation techniques with the architectures that have been proposed so far, the lack of coordination may lead to substantial drops in energy-saving performance, while the introduction of coordination requires the broad consensus of a standard body (see for example the ongoing work within the IEEE 802.3az Energy Efficient Ethernet Task Force) or the full cooperation of large portions of the entire network. Even within a single circuit pack, new components, and therefore new sources of energy consumption, must be added to coordinate the clock frequency of multiple rate-scaling devices.

Second, while the energy-saving performance results presented for rate-adaptation techniques are generally encouraging, they heavily depend on the specific set of operating states that are available in a given device and on the resulting power-rate (PR) function. When different schemes are compared, the final choice for the best solution can only be determined after entering the actual parameters of a practical device. General guidelines for straightforward design practices remain unavailable.

Therefore, it would be desirable to have a scheme for rate adaptation that combine the best properties of sleep-state exploitation and rate scaling while overcoming the limitations of the rate-adaptation techniques that are available in the prior art. [AF Question: should the "limitations" be spelled out explicitly here (e.g., need for coordination, lack of a clear winner, lack of a clear trade-off between energy savings and delay degradation)?]

SUMMARY OF THE INVENTION

An object of the present invention is to provide an improved system and method for achieving energy efficiencies in packet networks via rate adaptation.

According to an aspect of the invention there is provided a method of establishing a rate-adaptation domain in a packet network having a plurality of connected network nodes not providing rate adaptation, the method having the steps of first, partitioning the plurality of connected network nodes into subdomains, each subdomain having connecting interfaces with at least one other subdomain. Then, identifying those rate independent connecting interfaces among the connecting interfaces wherein the integrity of the data transfers through the connecting interfaces is preserved independent of the operating states of those subdomains connected. Next, identifying at least one subdomain for which all connecting interfaces are rate independent connecting interfaces; and operating this subdomain as a rate independent subdomain.

In some embodiments of the invention the operating step includes receiving packets at an input interface from a domain immediately upstream to the rate-adaptation domain; and establishing Quality-of-Service requirements associated with the received packets. Further, processing the received packets in a processing unit; dispatching packets at an output interface to a domain immediately downstream from the rate-adaptation domain; establishing a set of state variables; controlling the operating state of the processing unit with the state variables so as to control the rate at which packets are dispatched over the output interface; selecting such state variables so as to satisfy a feasible departure curve; and further selecting such state variables so as to reduce energy consumption in the rate-adaptation domain.

Advantageously, in certain embodiments the packet processing step consists of at least one of the group of parsing, modifying, and storing in a buffer queue. Also, in some embodiments the further selecting step selects state variables so as to place the processing unit in a sleep state or selects state variables so as to adjust the clock rate of the processing unit. As well, in some embodiments, the feasible departure curve is an optimal departure curve.

According to another aspect of the invention, there is provided a system having a rate-adaptation domain in a packet network having a plurality of connected network nodes. The system includes a plurality of subdomains, each subdomain being a partitioned subset of the plurality of connected network nodes, each subdomain having connecting interfaces with at least one other subdomain. As well, the system includes a set of rate independent connecting interfaces among the connecting interfaces wherein the integrity of the data transfers through the connecting interfaces is preserved independent of the operating states of those subdomains connected; at least one subdomain for which all connecting interfaces are rate independent connecting interfaces; and wherein the at least one subdomain operates as a rate-adaptation subdomain.

In some embodiments of the invention the at least one subdomain further includes an input interface for receiving packets from a domain immediately upstream to the rate-adaptation domain; a set of Quality-of-Service requirements associated with the received packets; a processing unit for processing the received packets; an output interface for dispatching packets to a domain immediately downstream from the rate-adaptation domain; a set of state variables for controlling the operating state of the processing unit wherein the state variables control the rate at which packets are dispatched over the output interface; a subset of such state variables selected so as to satisfy a feasible departure curve; and a further subset of the subset of state variables selected so as to reduce energy consumption in the rate-adaptation domain.

Advantageously, in certain embodiments the system further includes a buffer queue wherein the processing unit may store packets which have been at least one of the set of parsed and modified by the processing unit. As well, the state variables may be selected to control setting the processing unit in a sleep state or adjusting the clock rate of the processing unit. In certain embodiments, the feasible departure curve is an optimal departure curve.

Note: in the following the description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

BRIEF DESCRIPTION OF THE DRAWINGS

The present invention will be further understood from the following detailed description of embodiments of the invention, with reference to the drawings in which:

FIGS. 3a and 3b illustrate a set of arrival and departure curves;

FIGS. 4a and 4b illustrate a set of optimal service curves for the arrival curves of FIGS. 3a and 3b respectively;

DETAILED DESCRIPTION

Figure 1:
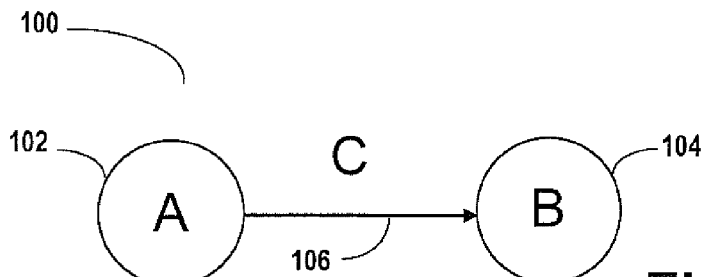
FIG. 1 illustrates an example of network nodes connected by a data-path in accordance with the known art.

Following are definitions of terms and concepts that are used throughout the description. Also described is the reference model that is used for evaluating the energy-saving performance of rate adaptation schemes.

A rate-adaptive networking device is a device that receives and forwards data packets over one or more interfaces and is capable of adjusting its operating state to the traffic load it is offered. The rate-adaptive device is arranged with a finite set $S=\{s_k, k=1 \ldots K\}$ of operating states, where each state is identified by fixed values of clock frequency ($f_k$) and power-supply voltage ($V_k$): $s_k=(f_k, V_k)$. Since a unique traffic processing capacity r can be associated with every frequency value f, we can represent the operating states also by reference to the respective processing capacities: $s_k \equiv (r_k, V_k)$. For each state $s_k$, an active substate $s_k^a$, an idle substate $s_k^i$, and a transition substate $s_k^t$ are further defined, depending on whether the device is processing traffic ($s_k^a$), not processing traffic ($s_k^i$), or transitioning to state $s_k$ from a different state $s_j$ ($s_k^t$). In a first-order approximation of the energy model for rate-adaptive devices, fixed levels of power consumption ($P_k^a$, $P_k^i$, $P_k^t$) are associated with each substate. The three power consumption levels are referred to as the active power, the idle power, and the transition power, respectively.

For a given device, it is assumed that the transition time $\delta$, which is the time needed to complete a state transition, is fixed and independent of the two states involved in the transition: $\delta(s_j, s_k) = \delta \forall (j,k)$. As a conservative assumption, it is assumed that no traffic processing can take place during a state transition.

Eq. (1) expresses the energy consumed over a time interval of duration T based on the time spent in each substate:

$$E(T) = \sum_{k=1}^{K} (P_k^a \cdot T_k^a + P_k^i \cdot T_k^i + P_k^t \cdot T_k^t) \quad (1)$$

The idle power can comfortably be assumed to be always lower than the active power: $P_k^j = \beta \cdot P_k^a, 0 < \beta < 1$. Considering that the device remains idle during a state transition, it is reasonable to argue that the transition power $P_k^t$ should be defined as the average of the idle power for the states before and after the state transition, and therefore as a function of both states: $P_k^t = (P_j^i + P_k^i)/2 = P_k^t(j,k)$. Observing that, under fluctuating load levels, for every transition into a state there is always a transition out of the same state, the inbound and outbound idle power contributions for state $s_k$ can be aggregated into a fixed transition power $P_k^t = P_k^i$ for the inbound state transition, and accordingly remove the idle-power contribution $P_k^i/2$ from the transition power for the outbound transition. Eq. (1) may now be rewritten as follows:

$$E(T) = \sum_{k=1}^{K} [P_k^a \cdot T_k^a + P_k^i \cdot (T_k^i + T_k^t)] \quad (2)$$

Eq. (2) is the metric of reference for comparing the energy-saving performance of different rate-adaptation schemes.

In a sleep-state exploitation device only two operating states are available: the full-capacity state $s_C \equiv (C, V_C)$ and the sleep state $s_S \equiv (0, V_S)$. The energy equation becomes as follows:

$$E(T) = P_C^a \cdot T_C^a + P_C^i \cdot (T_C^i + T_C^t) + P_S^i \cdot (T_S^i + T_S^t) \quad (3)$$

To take advantage of the reduced power consumption in sleep state, the device must transition out of the full-capacity state every time there is no packet to be processed, so that $T_C^i = 0$:

$$E(T) = P_C^a \cdot T_C^a + P_C^i \cdot T_C^t + P_S^i \cdot (T_S^i + T_S^t) \quad (4)$$

Sleep-state exploitation matches the average offered traffic load $\lambda$ by limiting the time spent in the full-capacity state:

$$\lambda = C \frac{T_C^a}{T} \quad (5)$$

In a rate-scaling device, eq. (2) remains the energy equation of reference, only with the restriction that no sleep state is included in the set of operating states available. The device matches the offered load by proper distribution of the time spent in each operating state:

$$\lambda = \frac{\sum_{k=1}^{K} r_k \cdot T_k^a}{T} \quad (6)$$

The type of concavity of the power-rate function of a device should drive the selection of the rate-adaptation scheme: if the function is concave over the full set of available processing capacities, i.e., $((P(r_1)+P(r_2))/2 \leq P((r_1+r_2)/2)$ $\forall r_1 < r_2$, the adoption of sleep-state exploitation is the obvious choice, if effective at all in reducing energy consumption. If instead the curve is convex, i.e., $(P(r_1)+P(r_2))/2 \geq P((r_1+r_2)/2)$ $\forall r_1 > r_2$, a properly designed rate-scaling scheme can yield higher energy savings.

Rate-Adaptation Representation of Packet Networks

It has been historically argued that tight coordination between adjacent network nodes is necessary for certain rate-adaptation techniques to yield any energy-saving gains. The need for coordination hinders the deployment of those techniques because no new technology can be reasonably expected to be exhaustively deployed overnight in any multi-player environment. The following development shows via a simple data path abstraction that the need for coordination can be entirely removed and that rate-adaptive devices can be deployed incrementally, both within individual network nodes and in the network at large.

Referring to FIG. 1, there may be seen an example of the simplest data-path configuration 100, wherein a rate-adaptive device 102 forwards packets to a rate-adaptive device 104 over an interface 106.

Devices A and B are arranged with respective sets of rate-adaptation operating states, possibly identical. The nature of interface C determines whether the states of devices A and B must be controlled jointly or can be controlled separately:

If interface C requires both devices to be in consistent rate-adaptation states in order for the integrity of any data transferred over C to be preserved, the states of devices A and B must be controlled jointly. This would be an example of a case wherein devices A and B belong to the same rate-adaptation domain. As an example of equipment, the transmitter and receiver at the two ends of an optical fiber can be seen as parts of the same rate-adaptation domain.

If the integrity of data transfers over interface C is preserved independently of the operating states of devices A and B, there is no need for coordination between the two devices, which thus belong to distinct rate-adaptation domains. As an example, two devices that are separated by a buffer memory in the packet processing pipeline of a router's line card belong to distinct rate-adaptation domains and their operating states do not strictly require coordination as long as the buffer memory can be accessed at different speeds for write and read operations.

As a more formal definition, a rate-adaptation domain may consist of one input interface where packets are received from the domain immediately upstream, a processing unit where packets may be parsed, modified, or assigned to buffer queues, and one output interface through which packets are dispatched to the domain immediately downstream. The rate-adaptation domain maintains state variables that drive the operating state of the processing unit and therefore the rate at which packets are forwarded over the output interface. For stability purposes, it is assumed that the maximum transmission capacity of the output interface and the maximum processing capacity of the processing unit are identical and never lower than the maximum capacity of the input interface.

Figure 2A:
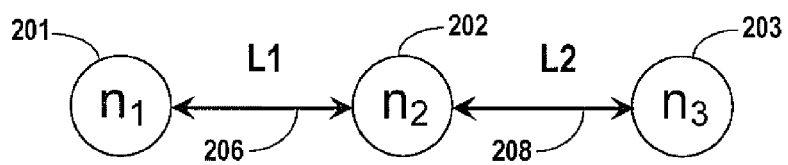
FIG. 2a illustrates a set of network nodes connected by bidirectional links in accordance with the known art.
Figure 2B:
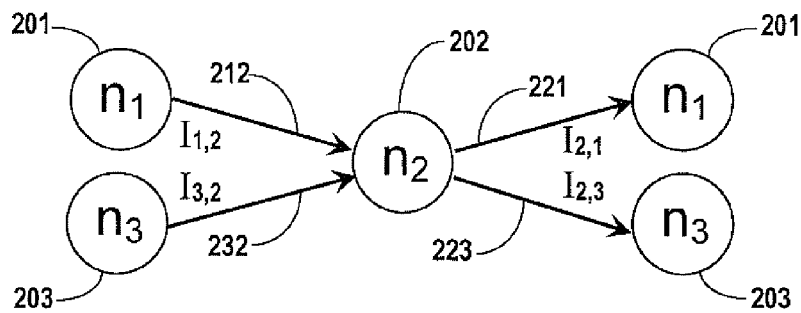
FIG. 2b illustrates an alternative version of FIG. 2a in which the bidirectional links are split into their unidirectional components.
Figure 2C:
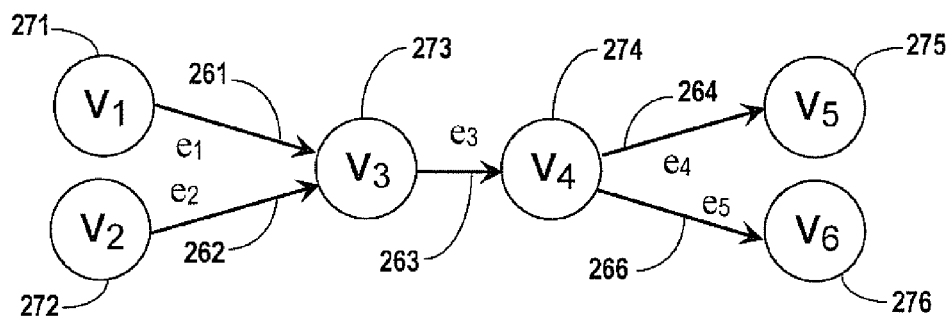
FIG. 2c illustrates a directed graph version of FIG. 2b in which vertices represent rate-adaptation domains and edges represent interfaces between the domains.

Referring to FIG. 2a there may be seen three network nodes $n_1$ 201, $n_2$ 202, and $n_3$ 203 connected by bidirectional links L1 206 and L2 208. Node $n_2$ 202 may for example be a router with output-queued 2×2 switch fabric. Referring to FIG. 2b, it may be seen that each bidirectional link is split into its two unidirectional components (L1 206 splits into $I_{1,2}$ 212 and $I_{2,1}$ 221, L2 208 splits into $I_{2,3}$ 223 and $I_{3,2}$ 232. This representation may be further elaborated as shown in the directed graph of FIG. 2c, wherein the vertices $v_1$ 271 through $v_6$ 276 represent rate-adaptation domains and the edges $e_1$ 261 through $e_5$ 265 represent the interfaces between them.

More specifically:

vertex $v_1$ 271 includes the $n_1$ 201 transmitter and the $n_2$ 202 receiver at the two ends of link $I_{1,2}$ 212;

edge $e_1$ 261 is the portion of packet memory in $n_2$ 202 that is dedicated to packets arriving from link $I_{1,2}$ 212;

vertex $v_2$ 272 includes the $n_3$ 203 transmitter and the $n_2$ 202 receiver at the two ends of link $I_{3,2}$ 232;

edge $e_2$ 262 is the portion of packet memory in $n_2$ 202 that is dedicated to packets arriving from link $I_{3,2}$ 232;

vertex $v_3$ 273 is the interface aggregation module in $n_2$ 202 that multiplexes packet streams from links $I_{1,2}$ 212 and $I_{3,2}$ 232;

edge $e_3$ 263 is the buffer where packets from different input links are lined up into a single queue;

vertex $v_4$ is the header parsing module in $n_2$ 202, which assigns packets to their respective egress queues and prepares them for modification prior to transmission;

edge $e_4$ 264 is the buffer where packets waiting for transmission to node $n_1$ 201 are queued;

edge $e_5$ 265 is the buffer where packets waiting for transmission to node $n_3$ 203 are queued;

vertex $v_5$ includes the $n_2$ 202 transmitter and the $n_1$ 201 receiver at the two ends of link $I_{2,1}$ 221; and vertex $v_6$ includes the $n_2$ 202 transmitter and the $n_3$ 203 receiver at the two ends of link $I_{2,3}$ 223.

In the design of a network system with rate adaptation capabilities, the directed-graph representation of the system helps identify opportunities for the insertion of rate-adaptive devices. As well, the directed-graph representation allows a recognition of trade-offs between the benefits of designs with a small number of rate adaptation domains (lower delay penalties) and designs with a higher number of domains (lower complexity). The directed-graph representation indeed makes it evident that tight coordination between network nodes is not a necessary condition for the introduction of rate-adaptation capabilities in a packet network. Rate-adaptive devices that single-handedly form a rate adaptation domain can be added to the network incrementally, without requiring coordinated efforts from equipment vendors and service providers. It becomes apparent, for example, that a system designer can include a rate-adaptive network processor in a line card that has no rate-adaptive transceivers.

The following disclosure focuses on methods for controlling the operating state of a rate-adaptation domain that fully avoid any coordination between domains.

Implementation Guidelines for Rate-Adaptation Schemes

The following discussion identifies general guidelines for the effective implementation of rate-adaptation schemes.

Consider a rate-adaptation domain in isolation. Through its state-setting policy, a rate-adaptation scheme sets the sequence of operating states in response to a sequence of packet arrivals with the objective of minimizing energy consumption in the domain while not violating the quality-of-service (QoS) requirements of the incoming traffic. Different types of traffic may present different types of QoS requirements, expressed through respective QoS constraints.

Listed here are a number of useful definitions and implications:

An arrival curve $A(t)$, $t \geq 0$, is a right-continuous function that counts the number of bits that have arrived to the rate-adaptation domain in time interval [0,t]. In a practical non-fluid domain, where bits are grouped in packets and all bits of a packet are considered available for processing only after the last bit has arrived, $A(t)$ is a staircase function.

A departure curve $D(t)$, $t \geq 0$, is a right-continuous function that counts the number of bits that have departed from the rate-adaptation domain in time interval [0,t].

For a given arrival curve $A(t)$, a minimum departure curve $D_{min}(t)$ is a departure function such that $D_{min}(t) \leq A(t)$, $t \geq 0$ and is defined as the minimum number of bits that must depart by time t to satisfy the QoS requirements of the rate-adaptation domain.

To meet the QoS requirements of the incoming traffic, the sequence of operating states set by the rate adaptation scheme must produce a departure curve that always lies between the minimum departure curve (QOS constraint) and the arrival curve (causality constraint):

$$A(t) \geq D(t) \geq D_{min}(t), (t) \geq 0.$$

Such a departure curve is called feasible. Referring to FIG. 3a, there may be seen a minimum departure curve $D_{min}(t)$ and a feasible departure curve $D(t)$ for a given arrival curve $A(t)$ under two types of delay-based QoS constraint.

In the example of FIG. 3a, the QoS constraint requires that all packets that arrive between time 0 and time T be delivered by time T. The feasible departure curve shown in the diagram derives from a sequence of three operating states $s_1, s_2$, and $s_3$ that have increasing processing capacity. In the case of FIG. 3b, a maximum delay d is accepted for the transmission of every packet. The feasible departure curve shown is obtained from the sequence of two operating states $s_1$ and $s_2$ where the first state has null processing capacity.

It is known that for systems with convex power-rate function the departure curve that minimizes energy consumption, called the optimal departure curve $D_{opt}(t)$, is the shortest feasible curve between the points $(0, A(0))$ and $(T, D_{min}(t))$. For quick visualization of the result, the following has been suggested:

"Consider a string that is restricted to lie between $A(t)$ and $D_{min}(t)$. Tie its one end at the origin and pass the other end through $D_{min}(t)$. Now if the string is made taut, its trajectory is the same as the optimal curve."

FIGS. 4a and 4b show the optimal service curves for the two examples of FIGS. 3a and 3b respectively (it should be noted that instantaneous state transitions are assumed far the depiction of the curves of FIG. 3 and FIG. 4).

The "shortest-string result" for convex power-rate functions indicates that energy minimization is achieved when the processing capacity of the rate-adaptation domain is set equal to the average rate needed to meet the QoS constraint exactly by the time available to complete the task.

The following differences can be appreciated between a practical rate-adaptation domain and the more abstract reference system for the results shown in FIG. 4:

1. In the abstract reference system, the operating state can be chosen out of an infinite set, with a continuous range of processing capacities available; in the practical rate-adaptation domain the set of operating states is finite, with discrete values of processing capacity available. As a consequence, the optimal departure curve for the practical domain typically yields lower energy savings than the optimal curve for the ideal system.

2. In the abstract system all state transitions are instantaneous; in the practical domain, state transitions complete within a fixed amount of time, during which no traffic processing can take place.

3. In the abstract system, which processes a continuous stream of bits, state transitions can occur at any time. In the practical domain, which processes bits in atomic packets, state transitions can only occur at packet processing boundaries.

4. In the abstract system the arrival curve A(t) is known, so that the minimum departure curve $D_{min}(t)$ can be tailored around it before the traffic starts arriving; in the practical domain the arrival curve is unknown.

It is desired to implement a practical rate-adaptation scheme that never violates a given delay constraint d for all packets that traverse a single rate-adaptation domain. In approaching the implementation, the discussion is developed along the following three dimensions:

1. subdivision of the time axis into operating intervals;
2. optimization of the reference power-rate function; and
3. specification of the state-setting policy.

Operating Intervals

The extended duration of state transitions in the practical rate-adaptation domain motivates the subdivision of the time axis into intervals of variable duration but never shorter than a fixed amount h, called the minimum hold time. In fact, the time cost δ of a state transition implies that frequent state transitions must be deterred to prevent them from occupying most of the operating time of the rate-adaptation domain. If the domain is allowed to spend substantial portions of its operating time switching states, then it must execute all traffic processing work within shorter time intervals, at higher power levels. Even without counting the energy consumed during workless transitions, with a convex power-rate function the simple deviation of the operating state from the optimal average-rate point causes significant energy losses. Forcing the operating state of the domain to remain unchanged for a minimum hold time h>>δ keeps the total transition time below an acceptable fraction of the total operating time.

Figure 5:
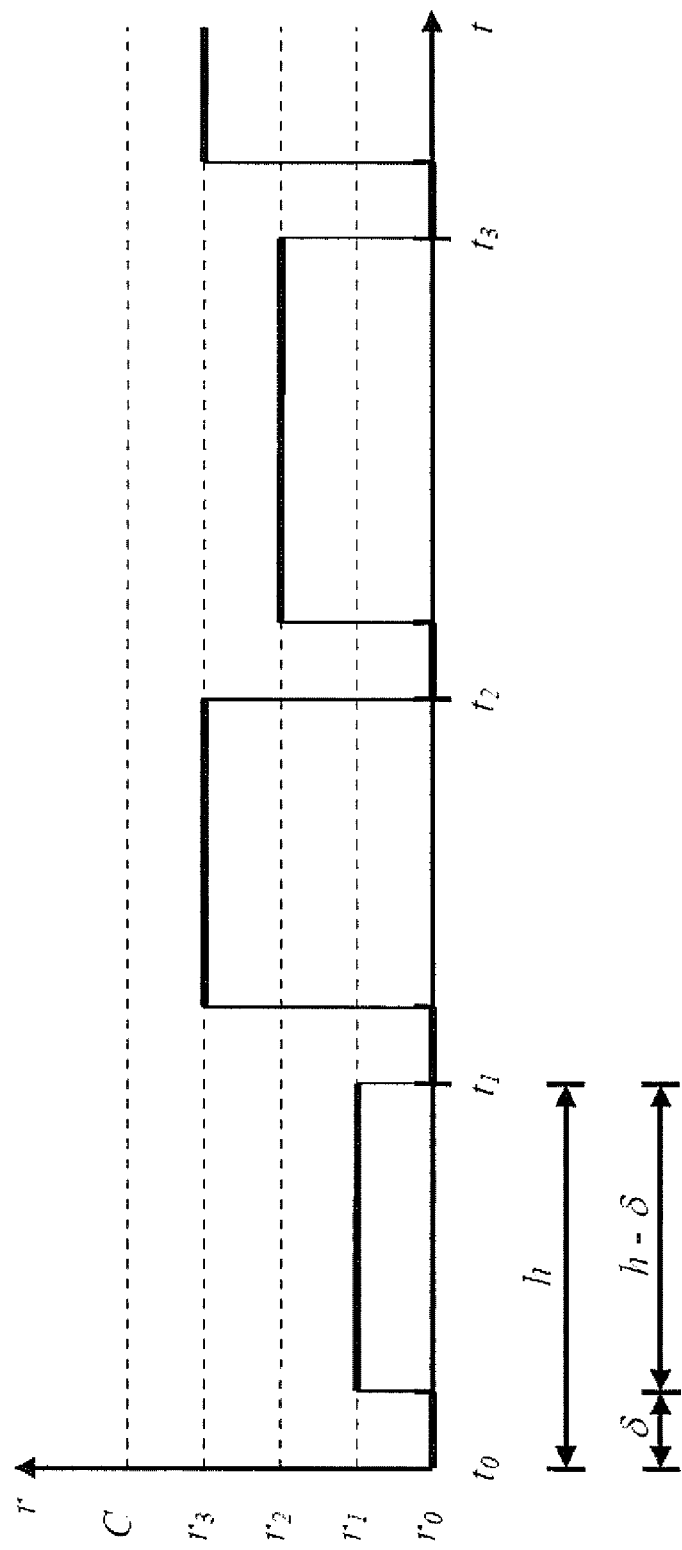
FIG. 5 is a plot illustrating a sequence of operating intervals for a rate-adaptation domain according to an embodiment of the invention.

Our target rate-adaptation scheme divides the operation of the rate-adaptation domain into a sequence of operating intervals $(t_n, t_{n+1}]$ of variable duration $h_n$, $h_n > h$. The operating state (and processing capacity) in any operating interval is always different than the state (and capacity) in the interval that immediately follows. These relations may be seen by reference to FIG. 5.

With reference to a generic operating interval $(t_n, t_{n+1}]$, the rate-adaptation scheme decides to set a different operating state at time $t_n$. At time $t_n + \delta$ the state transition is complete and the rate-adaptation domain can start processing traffic again. Starting at time $t_n + h$, the rate-adaptation domain checks at every packet processing completion if the state-setting policy requires the operating state to be changed. The end of the operating interval is reached at time $t_{n+1} = t_n + h_n \geq t_n + h$, when the rate-adaptation domain completes the processing of a packet and the state-setting policy indicates the necessity of a state change.

Optimization of the Power-Rate Function

The power-rate function of a rate-adaptation domain defines the relationship between processing capacity and power consumption in the active substate. In a practical device the power-rate function is typically defined over a finite set of discrete capacity values. However, for convenience of presentation and after considering that the composition of the set of discrete capacity values of the practical domain constitutes itself a design choice, this section refers to power-rate functions that are defined over continuous ranges of capacity values.

The current lack of commercial rate-adaptive network devices that can quickly adjust their operating state to traffic load conditions makes for a lack of real-life numbers for key parameters such as the state transition time and the power-rate function. However, sleep-state exploitation devices and rate-scaling devices that incorporate DVFS capabilities to offer an extended set of operating states, only controlled over a larger timescale, do exist (especially general-purpose processors [INTEL$_{PXA}$, INTEL$_{PENTIUM}$]) and can be used to obtain a reasonable indication of what future devices can accomplish.

Figure 6:
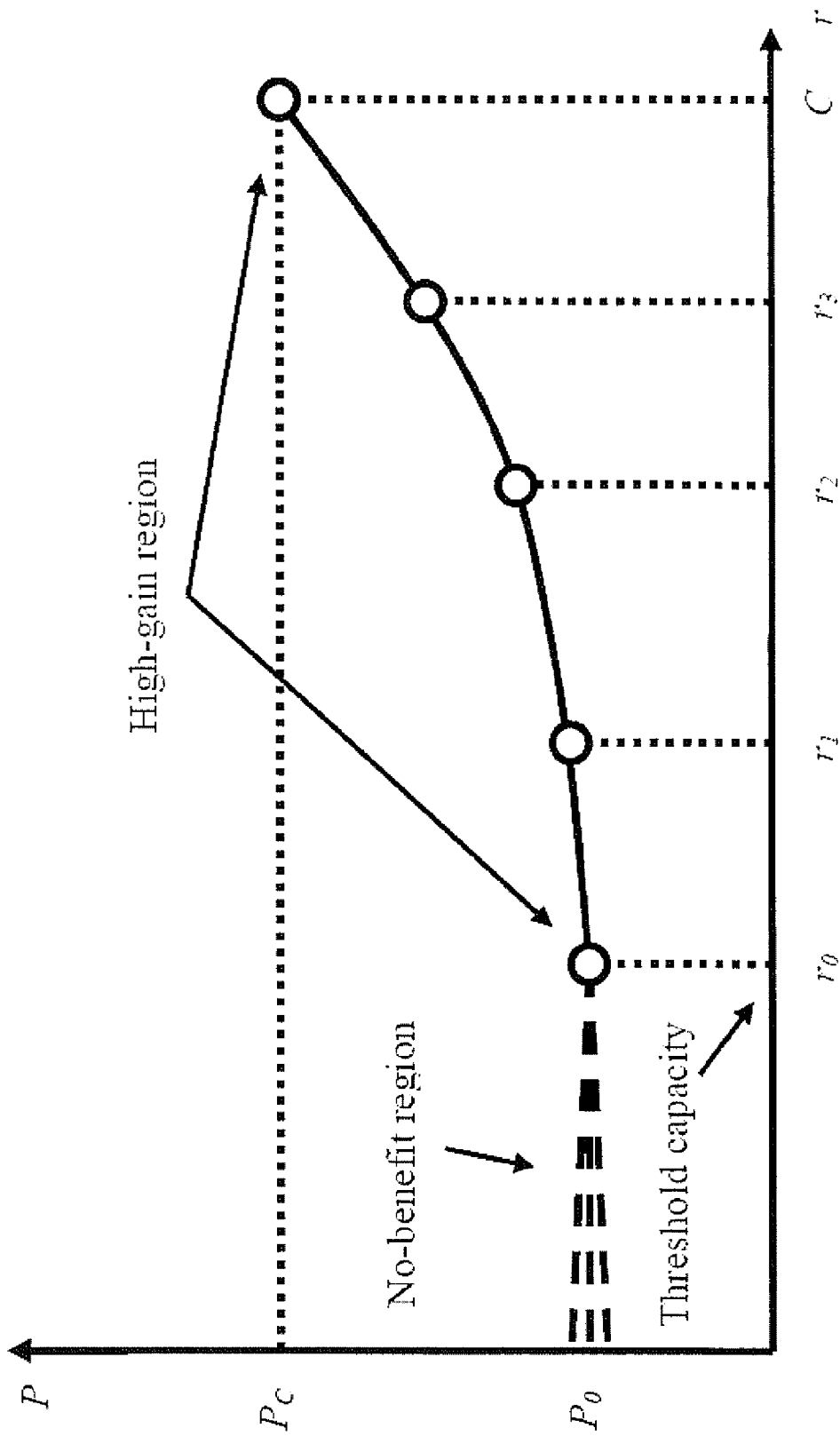
FIG. 6 is a plot illustrating different operating regions for a rate scaling device.

Focusing now on DVFS-capable rate-scaling devices, a commonly accepted conclusion about their power-rate function is its partition into two different operating regions. These two different operating regions may be seen in FIG. 6, where a finite set of operating states is explicitly marked. In the upper portion of the capacity range the function is evidently convex, which motivates the deployment of rate-scaling capabilities. However, the benefits of rate scaling become less evident in the lower portion of the capacity range, especially for very low operating frequencies. While the capacity threshold that marks the behavioral discontinuity obviously changes across devices, in all cases the loss of energy-saving benefits is such that it makes no sense to set the operating state of the device in the low-capacity region. As a consequence, the energy efficiency of the rate-scaling device is excellent when heavier traffic loads keep it in operation in the high-gain region, but becomes poor under lighter traffic loads.

Figure 7:
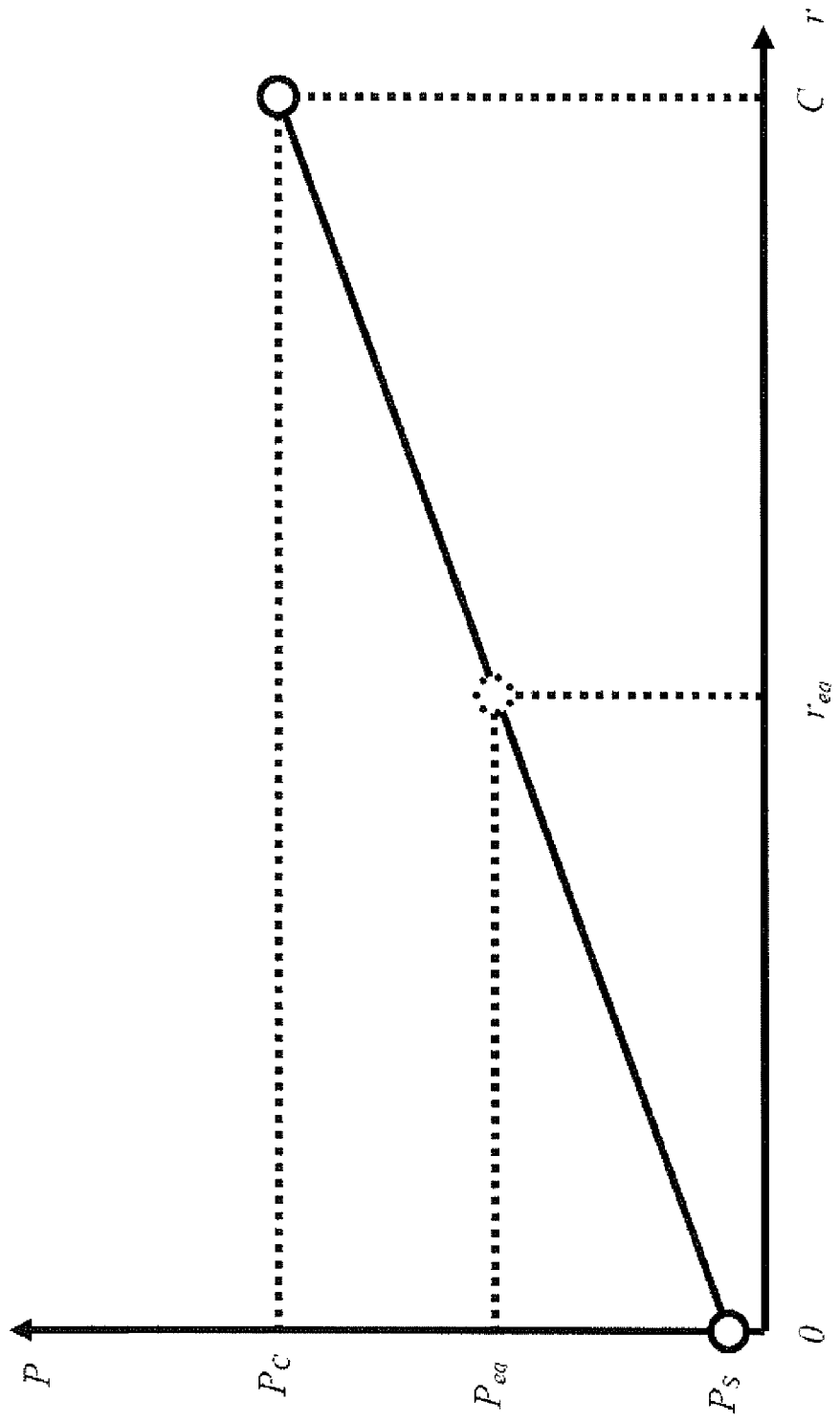
FIG. 7 is a plot illustrating power consumption for a sleep-state exploitation device.

It is relevant now to consider the equivalent power-rate function of a sleep-state exploitation device whose operation alternates between the full-capacity state $s_C \equiv (C, P_C)$ and the sleep state $s_S(0, P_S)$. In the ideal case of a device with instantaneous state transitions (δ=0) the equivalent power-rate function is a continuous function where the operating state of the device over an interval of duration T is derived from the time $T_C$ spent in the full-capacity state as follows: $P_{eq}(T) = [P_C \cdot T_C + P_S \cdot (T - T_C)]/T$. Refer to FIG. 7.

Figure 8:
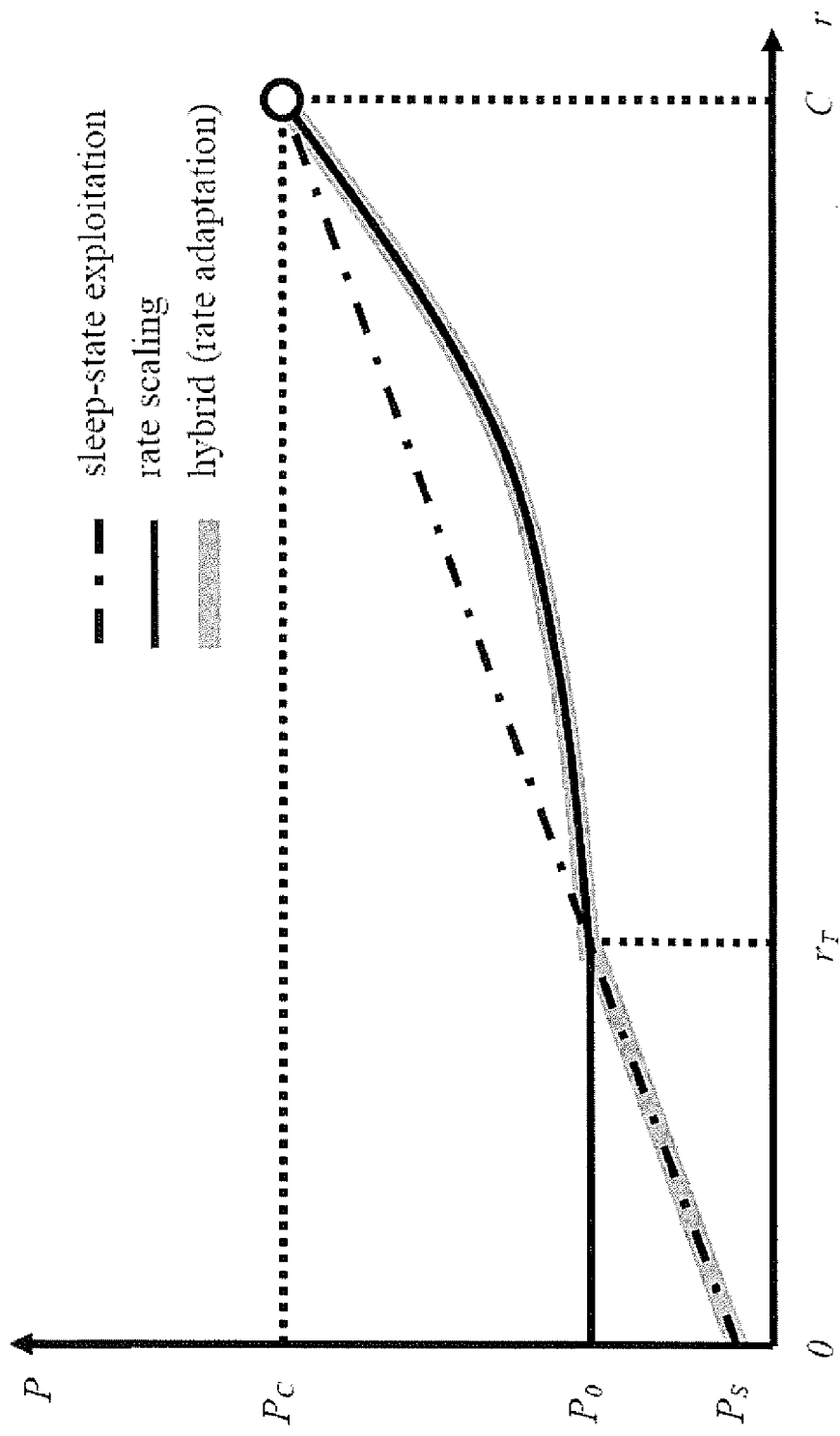
FIG. 8 is a plot illustrating power consumption for a hybrid combination of a rate-scaling and sleep-state exploitation device.

If a rate-scaling device and a sleep-state exploitation device with identical full-capacity state $s_C(C, P_c)$ are compared, and the condition holds that that the minimum-capacity power $P_0$ in the former is higher than the sleep-state power $P_S$ in the latter, referring to FIG. 8 it can easily be observed that the sleep-state exploitation device yields better energy savings in the lower portion of the capacity range ($r < r_T$ where $r_T$ is the value of capacity where the two curves intersect), while the rate-scaling device prevails in the upper portion ($r > r_T$).

FIG. 8 suggests that an optimal power-rate function can be found in a practical rate-adaptation device that resorts to sleep-state exploitation under light loads (i.e., for traffic arrival rate below $r_T$) and to rate scaling under heavier loads (i.e., for traffic arrival rate above $r_T$). While it is true that a device with such a hybrid power-rate function would improve over the underlying rate-scaling and sleep-state exploitation devices, an even better hybrid power-rate function can be defined based on the observation that the optimal power-rate function is one that starting from the power-rate function of the available rate-scaling technology minimizes the area under its graph. In fact, the minimum-area condition defines the function that associates the minimum power level possible with each operating state available. The curve for such function is obtained by joining the two components at the single point $(r_{T,opt}, P_{T,opt})$ where the tangent to the rate-scaling curve intersects the P axis in $(0, P_S)$. In fact, by definition of convex curve the tangent to the curve that includes a fixed point $(0, P_S)$ below the curve is also the straight line with minimum slope out of all straight lines by the same point that ever intersect the convex curve.

Figure 9:
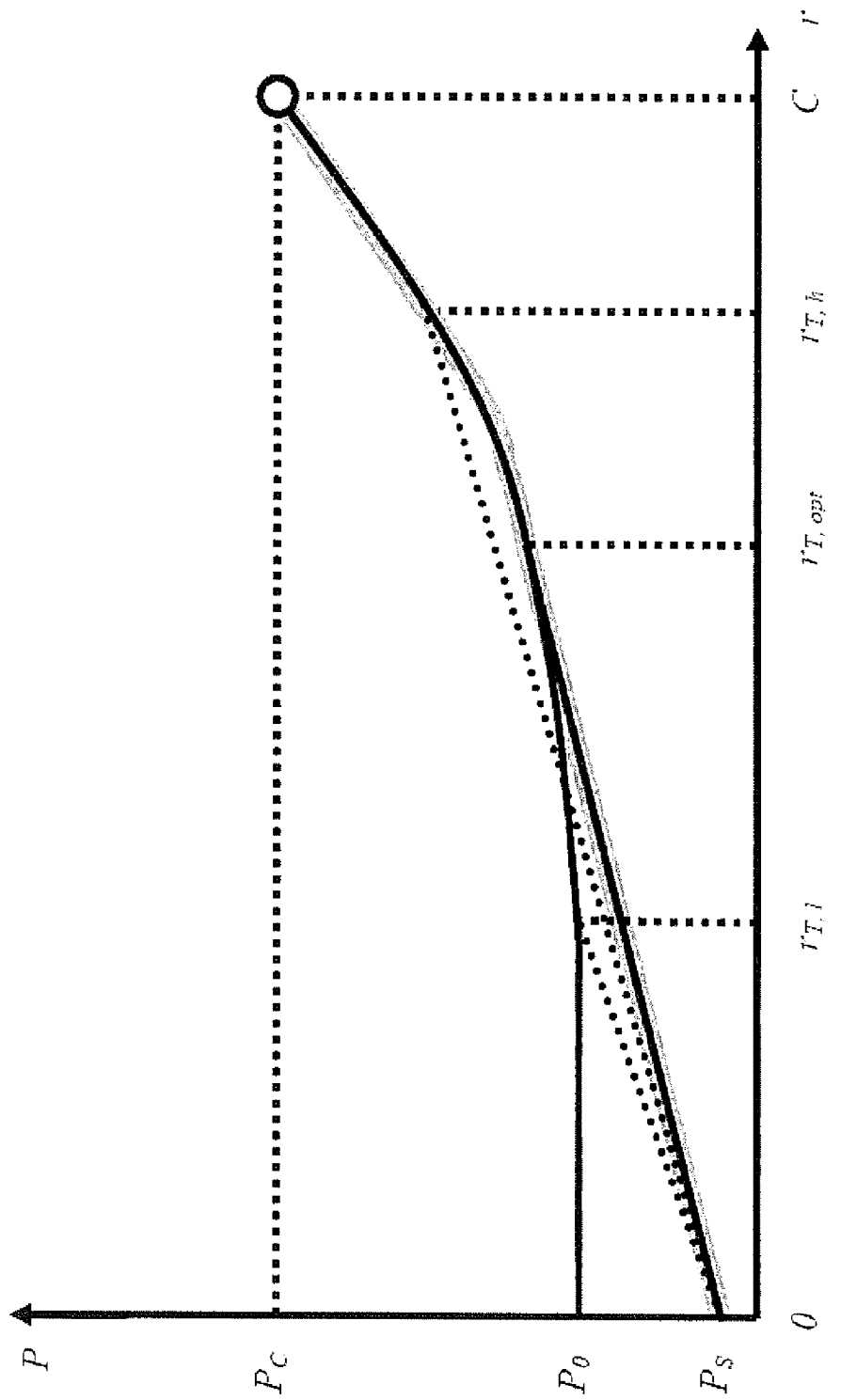
FIG. 9 is a plot illustrating the optimal power function transition point from sleep-state exploitation to rate-scaling according to an embodiment of the invention.

FIG. 9 illustrates graphically why such a definition of $(r_{T,opt}, P_{T,opt})$ is the one that minimizes energy consumption: whether there is a move of the processing capacity of the joining point lower ($r_{T,j} < r_{T,opt}$) or higher ($r_{T,h} < r_{T,opt}$), the result ends up with a larger area under the hybrid curve. In mathematical form, $r_{T,opt}$ is defined as the value of processing capacity such that:

$$\frac{d}{dr}P_{rs}(r_{T,opt}) = \frac{P_{rs}(r_{T,opt}) - P_S}{r_{T,opt}} \quad (7)$$

where $P_{rs}(r)$ is the power-rate function of the original rate-scaling domain.

Specification of the State-Setting Policy

The state-setting policy is the algorithmic core of the rate-adaptation scheme. It sets the time and the destination of each state transition, based on system parameters (power-rate function, transition time δ, and minimum hold time h), QoS constraints (maximum added delay d), and state variables (queue length Q and traffic arrival measures).

First addressed is the determination of the time when a state transition should occur. In a previous section it was established that, in order to absorb the cost of a state transition, the domain should remain in the resulting state for at least a time h after starting that transition. During the operating interval, the processing capacity of the domain remains unchanged.

In setting the value of h, the tradeoff is between extending h to minimize the negative effect of state transitions (an increase of average processing rate by up to h/(h−δ) is needed to compensate the loss of processing capacity caused by a transition time δ), and contracting h to improve the accuracy of the departure curve D(t) in tracking the arrival curve A(t) (the larger h, the longer the time the two curves have to diverge). Since the delay constraint d expresses the maximum accepted distance between arrival and departure curve, it may be used to drive the specification of h.

The following definition is an important property that drives the classification of state-setting policies.

Weak Backlog Clearing Property—At the beginning $t_0$ of the operating interval the state-setting policy chooses the processing capacity from the set of available capacities that are sufficient to clear the current queue backlog $Q(t_0) > 0$ by the closest possible end of the operating interval $(t_1 = t_0 + h)$: $r(t_0) \in \{r_k : s_k \in S \wedge r_k \geq Q(t_0)/(h-\delta)\}$. If no such capacity is available, the policy chooses the full capacity of the rate adaptation domain: $r(t_0) = C$.

A state-setting policy that holds the weak backlog clearing property is referred to as a weak backlog clearing policy. It should be noted that the weak backlog clearing property has no bearing over the case with null backlog (i.e., when $Q(t_0) = 0$).

The following theorem gives the relationship between d and h in a fluid rate-adaptation domain, where bits arrive in a continuous stream without packet boundaries.

Theorem 1—In a fluid rate-adaptation domain with weak backlog clearing policy the delay constraint d is bounded as follows:

$$d < d_{max} = 2h + \delta \quad (8)$$

Proof: Without loss of generality, let $t_0$ be the start time of an operating interval where the state-setting policy chooses a processing capacity $r(t_0)$ such that $r(t_0) > Q(t_0)/(h-\delta)$. At time $t_1 = t_0 + h$, when the rate-adaptation domain has the next chance to set the processing capacity, the queue backlog is $Q(t_1) = Q(t_0) + A(t_0,t_1) - r(t_0) \cdot (h-\delta) \leq C \cdot h$, where $A(t_0,t_1) \leq C \cdot h$ is the number of bits received between $t_0$ and $t_1$. At time $t_1$, the domain sets a processing capacity $r(t_1)$ such that either $r(t_1) \geq Q(t_1)/(h-\delta)$ if $Q(t_1) \leq C \cdot (h-\delta)$, or $r(t_1) = C$ if $Q(t_1) > C \cdot (h-\delta)$.

The former case is trivial because it reproduces the conditions at time $t_0$, only with a rate that is possibly different.

In the latter case, the queue backlog at the next useful time $(t_2)$ for setting the processing capacity is $Q(t_2) = Q(t_1) + A(t_1, t_2) - C \cdot (h-\delta) \leq 2C \cdot h - C \cdot (h-\delta) = C \cdot (h+\delta)$. At time $t_2$, if $Q(t_2) \leq C \cdot (h-\delta)$ the domain returns to the condition of time $t_0$. Otherwise the processing capacity remains C, so that no state transition is triggered.

At this point there is no way for the queue length to grow any further beyond $Q_{max} = C \cdot (h+\delta)$. If $Q(t_2) = C \cdot h + \Delta B$, $\Delta B > 0$ and no more traffic arrives after $t_2$, it takes up to two full operating intervals to clear the backlog $Q(t_2)$: the first operating interval takes the backlog down to $Q(t_3) = \Delta B$ and the second interval guarantees that the backlog is cleared by $t_4 = t_3 + h$. The earliest time the last bit cleared by $t_4$ may have arrived so that $\Delta B > 0$ is $t_\epsilon = t_2 - \delta + \epsilon_1 \epsilon \rightarrow 0$, so that $d = t_4 - t_\epsilon < 2h + \delta$.

The scenario at time $t_2$ in the proof of Theorem 1 leads to the following formulation of a backlog clearing property that provides a tighter delay bound for given values of h and δ:

Strong Backlog Clearing Property—The processing capacity set at the beginning $t_0$ of the operating interval is chosen from the set of available capacities that are sufficient to clear the current queue backlog $Q(t_0) > 0$ by the closest possible end of the operating interval $(t_1 = t_0 + h)$ and are higher than the current capacity $r(t_0^-)$: $r(t_0) \in \{r_k : s_k \in S \wedge r_k \geq Q(t_0)/(h-\delta) \wedge r_k \geq r(t_0^-)\}$.

If no such capacity is available, the policy chooses the full capacity of the rate adaptation domain $(r(t_0) = C)$.

A state-setting policy that holds the strong backlog clearing property is referred to as a strong backlog clearing policy.

The following theorem defines the delay bound for a fluid rate-adaptation domain with strong backlog clearing policy.

Theorem 2—In a fluid rate-adaptation domain with strong backlog clearing policy the delay constraint d is bounded as follows:

$$d \leq d_{max} = h + \delta. \quad (9)$$

Proof Consider the same sequence of events as in the proof of Theorem 1, up to time when a backlog $Q(t_2) = C \cdot h + \Delta B$, $\Delta B > 0$ has accumulated in the queue. As opposed to the case with weak backlog clearing policy, the processing capacity of the rate-adaptation domain cannot be reduced again until the queue backlog is completely cleared. As a consequence $r(t_2) = C$ and no additional backlog is allowed to accumulate in the queue. The maximum queue backlog remains $Q_{max} = C \cdot (h+\delta)$ and $d_{max} = h + \delta$ is the maximum time it takes to forward the last bit in the queue after it arrives.

The following theorem defines the maximum queue length in a packetized rate-adaptation domain with strong backlog clearing policy.

Theorem 3—In a packetized rate-adaptation domain with strong backlog clearing policy, the queue size Q(t) is bounded as follows:

$$Q(t) \leq Q_{max}^{(P)} = C \cdot (h + \delta) + L_{max} \cdot \left(\frac{C}{r_{min}} - 1\right) \quad (10)$$

where $L_{max}$ is the maximum size of a packet in the rate adaptation domain and $r_{min}$ is the minimum non-null rate in the set of available rates $(r_{min} = \min_{s_k \in S}\{r_k : r_k > 0\})$.

Proof: Without loss of generality, let $t_0$ be the start time of an operating interval where the state-setting policy chooses a processing capacity $r(t_0)$ such that $r(t_0) \geq Q(t_0)/(h-\delta)$. At time $t_1$, when the packetized rate-adaptation domain has the next chance to set the processing capacity at the end of a packet transmission $(t_0 + h \leq t_1 < t_0 + h + L_{max}/r(t_0))$, the queue backlog is $Q(t_1) = Q(t_0) + A(t_0,t_1) - r(t_0) \cdot (t_1 - t_0 - \delta)$, with $A(t_0,t_1) \leq C \cdot (t_1 - t_0)$. Therefore:

$$Q(t_1) \leq (C - r(t_0)) \cdot (t_1 - t_0) + Q(t_0) + r(t_0) \cdot (h - h + \delta)$$

$$\therefore Q(t_1) \leq (C - r(t_0)) \cdot (h + L_{max}/r(t_0)) + r(t_0) \cdot h$$

$$\therefore Q(t_1) \leq C \cdot h + L_{max} \cdot (C/r_{min} - 1)$$

Since $Q(t_1) > C \cdot (h-\delta)$, at time $t_1$ the state-setting policy chooses $r(t_1) = C$ and during the subsequent state transition the rate-adaptation domain accumulates up to $C \cdot \delta$ more bits. At time $t_1 + \delta$, when $Q(t_1) \leq C \cdot h + L_{max} \cdot (C/r_{min} - 1)$, operation at the full capacity starts preventing the queue length from growing any further.

As shown in the proof of Theorem 2, in a rate-adaptation domain with strong backlog clearing policy the maximum delay is the time needed to clear the maximum backlog at full capacity. The following result immediately derives from Theorem 3:

Lemma 1: In a packetized rate-adaptation domain with strong backlog clearing policy the delay constraint d is bounded as follows:

$$d \leq d_{max}^{(P)} = h + \delta + L_{max} \cdot \left(\frac{1}{r_{min}} - \frac{1}{C}\right) \quad (11)$$

The identification of the selection criterion for the operating state of the rate-adaptation domain completes the specification of the state-setting policy. To retain the result of Lemma 1 on the relationship between the maximum added delay $d_{max}^{(P)}$ and the minimum hold time h the selection criterion must satisfy the strong backlog clearing property.

The simplest strong backlog clearing policy that also minimizes energy consumption is one that chooses capacity $$r(t_0) = \min_{s_k \in S} \{r_k : r_k \geq Q(t_0)/(h-\delta) \wedge r_k \geq r(t_0^-)\}$$

when $Q(t_0) > 0$ and capacity $$r(t_e) = \min_{s_k \in S} \{r_k : r_k < r(t_e^-)\}$$

at any time $t_e$ such that $Q(t_e) = 0$ (i.e., chooses the processing capacity immediately lower than the current one as soon as the queue gets empty, whether or not the duration of the current operating interval has passed the h mark). It should be noted that in both state-setting events the policy may find no capacity that satisfies the corresponding condition. In that case the policy retains the current capacity without triggering a state transition. It should also be noted that in a rate-adaptation scheme that combines rate scaling with sleep-state exploitation the set S of available operating states is formed by the union of the sleep state with the subset of states in the underlying rate-scaling scheme such that the associated processing capacities are not lower then the optimal threshold capacity $r_{T,opt}$:

$S = \{s_S\} \cup \{s_k \in S' : r_k \geq r_{T,opt}\}$ where S' is the set of operating states in the underlying rate-scaling scheme and $r_s = 0$ is the capacity associated with the sleep state. While the policy only allows single-step capacity decrements when the queue becomes empty to avoid wide state oscillations along the convex power-rate curve, the same policy imposes no restrictions on state transitions that cause capacity increments: at time $t_0$, when $Q(t_0) > 0$ and a new operating interval can start because at least h time has elapsed since the beginning of the current operating interval, the policy chooses the new processing capacity out of the full subset of available capacities that are not lower than the current one. The name for this state-setting policy is the simple strong backlog clearing (SSBC) policy.

To improve statistically the delay performance of the rate-adaptation domain, a predictor $\hat{A}(t)$ for the traffic arrival rate can be included in the state-setting policy. The simplest predictor uses the arrival rate of an operating interval as the arrival rate estimate for the next interval: $\hat{A}(t_n) = [A(t_{n+1}) - A(t_n)]/(t_{n+1} - t_n)$, where $t_n$ and $t_{n+1}$ are the start and end times of the $n^{th}$ operating interval. While the combination of the current queue length with an estimate of the arrivals for the next operating interval does improve the average delay performance of the rate adaptation domain, it cannot reduce the worst-case added delay of eq. (11). This is because a predictor, however accurate, has no actual control over future arrivals. Hereoafter are described the effects of including the simplest predictor in the state-setting decision at time $t_0$ such that $Q(t_0) > 0$ $$\left(r(t_0) = \min_{s_k \in S} \{r_k : r_k \geq [Q(t_0) + \hat{A}(t_0) \cdot h]/(h-\delta) \wedge r_k \geq r(t_0^-)\}\right)$$

and in the state-setting decision at time $t_e$ such that $Q(t_e) = 0$ $$\left(r(t_e) = \max_{s_k \in S} \{r_k : r_k < r(t_e^-) \wedge r_k \geq \hat{A}(t_e)\}\right).$$

The name for this state-setting policy is the predictive strong backlog clearing (PSBC) policy.

A slightly different approach to the combination of current state (the queue length $Q(t)$) and future arrivals (the predictor $\hat{A}(t)$) is derived from a rate-scaling method of the prior art [Nedevschi]. Instead of being projected over the entire operating interval to follow, the predictor for future arrivals is only applied to the time needed to complete the next transition, so that the new processing capacity is set based on the expected backlog at the time when the domain can start processing packets again. At time $t_0$, such that $Q(t_0) > 0$ this partially predictive strong backlog clearing (PPSBC) policy sets the processing capacity $r(t_0)$ for the next operating interval as follows:

$$r(t_0) = \min_{s_k \in S} \{r_k : r_k \geq [Q(t_0) + \hat{A}(t_0) \cdot \delta]/(h-\delta) \wedge r_k \geq r(t_0^-)\}.$$

At time $t_e$ such that $Q(t_e) = 0$ the PPSBC policy sets the processing capacity $r(t_e)$ for the next operating interval as follows:

$$r(t_e) = \max_{s_k \in S} \{r_k : r_k < r(t_e^-) \wedge r_k \geq \hat{A}(t_e)\}.$$

The discussion to this point has covered state-setting policies that hold the strong backlog clearing property. However, the experimental results presented in the following section also account for the performance of weak backlog clearing policies and of a non-backlog clearing policy.

Experimental Results

The energy-saving and delay performance of rate-adaptation schemes that incorporate the state-setting policies heretofore defined (SSBC, PSBC, and PPSBC) were studied by simulation of a 10 Gbps single-queue rate-adaptation domain fed by 10 independent Pareto sources, each capable of supplying up to 1 Gbps traffic. The sources generate 1000 Byte packets and have average burst time and average idle time of 50 ms. The packet-level simulation experiments were run using newly designed Queue subclasses for the ns2 simulation platform. In every experiment data were collected for 100 seconds of system time after expiration of a 5 second warm-up period.

The power-rate curve of the domain was derived by interpolation and normalization of the six operating states of the Intel® Pentium® M Processor as documented in the March 2004 Whitepaper, "Enhanced Intel® SpeedStep® Technology for the Intel® Pentium® M Processor" (which may be found at ftp://download.intel.com/design/network/papers/30117401.pdf):

$$P(r) = \begin{cases} P_0, & r < r_0 \\ P_0 + A \cdot (r - r_0)^3, & r \geq r_0 \end{cases} \quad (12)$$

where $r_0$=1.625 Gbps, $P_0$=0.232 W, and A=0.001308 W Gbps$^{-3}$. The operating states of Table 1 were assumed to be available to the state-setting policy.

It is assumed that the sleep power $P_S$ is a fraction of the base active power $P_0$ ($P_S=\gamma \cdot P_0$, $0<\gamma<1$) and that the idle power is a fraction of the active power: $P_k^i=\beta \cdot P_k^a \forall k$, $0<\beta<1$). Per eq. (7), the optimal threshold capacity is a function of the sleep power $P_S$ and therefore of the ratio $\gamma$ between sleep power and base active power. With the power-rate curve of eq. (12), a relatively low value of the ratio of ($\gamma$=0.125) yields $r(t_{T,opt})$=5.21 Gbps, whereas a relatively high value ($\gamma$=0.5) yields $r(t_{T,opt})$=4.51 Gbps. As a compromise between the two values, the minimum non-null capacity available in the rate-adaptation domain was set to 5 Gbps:

$$S=\{s_S\}\cup\{s_k\epsilon S':r_k\geq 5 \text{ Gbps}\}=\{s_S,s_5,s_6,s_7,s_8,s_9,s_{10}\}$$

The transition time $\delta$ is set at 1 ms knowing that it is well within the capabilities of existing technologies but still a cause of delays that may affect the user perception of end-to-end applications. In the evaluation of rate-scaling schemes that do not include sleep-state exploitation, the minimum non-null capacity available is set at 2 Gbps (Table 1 shows that there is no energy benefit in including $s_1$ in the set of available operating states).

TABLE 1

| State | Processing Capacity [Gbps] | Normalized Active Power [W] |
|---|---|---|
| $s_S$ | 0 (sleep) | $P_s$ |
| $s_1$ | 1 | 0.232 |
| $s_2$ | 2 | 0.232 |
| $s_3$ | 3 | 0.236 |
| $s_4$ | 4 | 0.249 |
| $s_5$ | 5 | 0.282 |
| $s_6$ | 6 | 0.341 |
| $s_7$ | 7 | 0.435 |
| $s_8$ | 8 | 0.571 |
| $s_9$ | 9 | 0.756 |
| $s_{10}$ | 10 | 1.000 |

Figure 10:
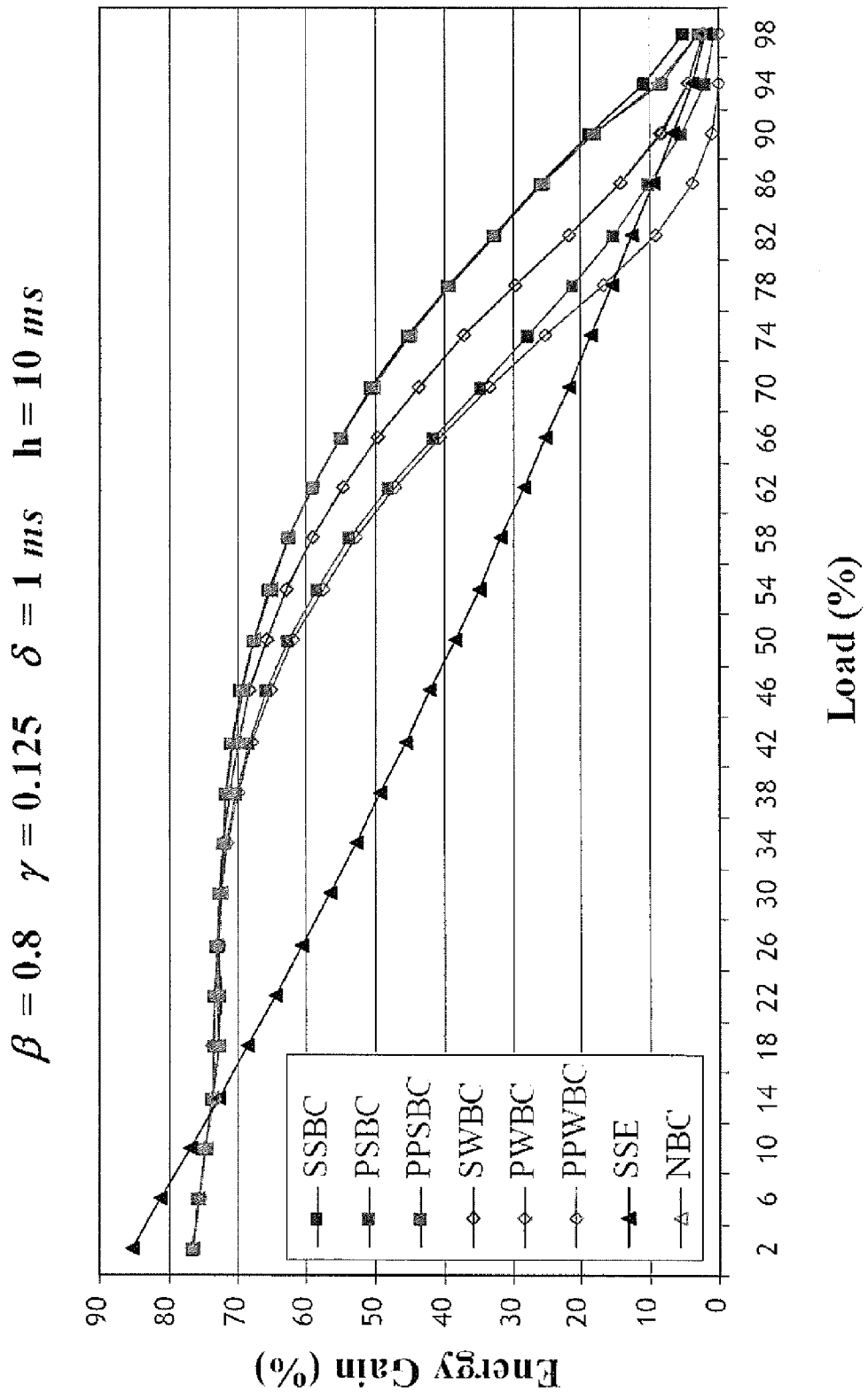
FIG. 10 is a comparison plot for the energy gains of several backlog clearing policies according to embodiments of the invention.

Referring to FIG. 10 there may be seen the energy gains achieved in a rate-scaling context by the three strong backlog clearing policies described previously (SSBC, PSBC, and PPSBC), by their weak backlog clearing counterparts (SWBC, PWBC, and PPWBC), and by a sleep-state exploitation (SSE) domain ($\gamma$=0.125), with respect to a domain that only alternates between active and idle substate at full processing capacity. For completeness, included in the comparison is also a non-backlog clearing (NBC) policy from the prior art [Nedevschi], where neither backlog clearing property holds because the policy only allows single-step increments within the set of available rates. In all cases the ratio between idle power and active power is $\beta$=0.8.

FIG. 10 provides the following important indications:

Rate adaptation is well-worth pursuing given its capability to achieve large energy savings, especially in the lower portion of the load range.

The advantage of sleep-state exploitation over rate scaling in the lower portion of the load range justifies the specification of rate-adaptation schemes that combine the two approaches.

All strong backlog clearing policies outperform their weak backlog clearing counterparts.

The PSBC policy clearly underperforms the SSBC and PPSBC policies, implying that the application of traffic arrival predictors should not be extended to the entire duration of the operating interval.

The energy-saving performance of the SSBC and PPSBC policies is at least as good as that of the pre-existing NBC policy.

Figure 11:
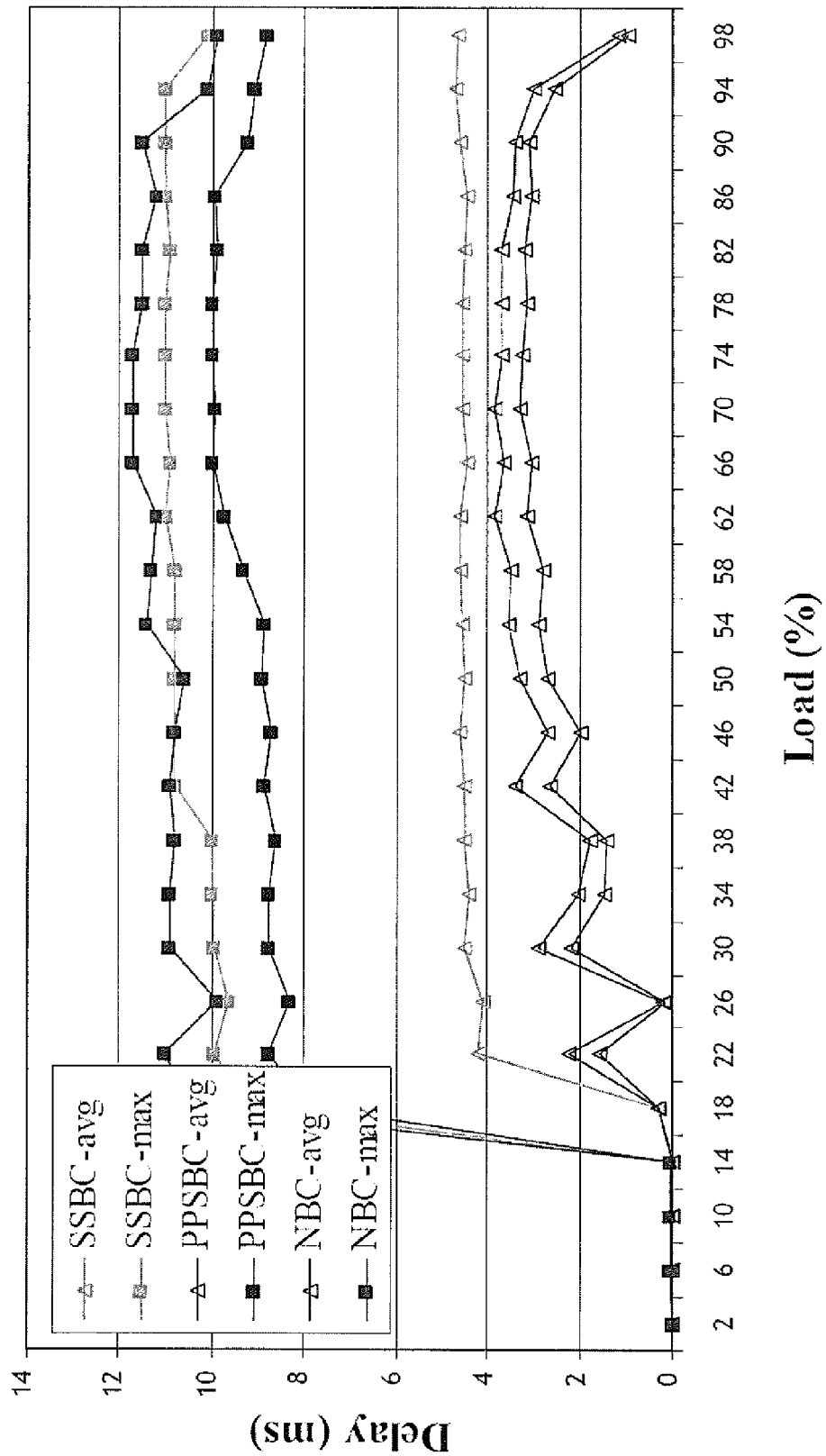
FIG. 11 is a further comparison plot for the extra delays of two specific strong backlog clearing policies according to embodiments of the invention.

To choose between the SSBC and PPSBC policies, their relative delay performances are illustrated in FIG. 11, which also plots the average and maximum delay for the NBC policy.

FIG. 11 shows that the SSBC and PPSBC policies keep the maximum delay within the 11 ms bound of eq. (11), whereas the NBC policy violates it (although not by large amounts in this experiment). The PPSBC policy consistently outperforms the SSBC policy with respect to both average and maximum delay, by margins that are related to the ratio between the transition time $\delta$, over which the PPSBC prediction is projected, and the minimum hold time h. For simplicity, in the remainder of this section are presented results only for the PPSBC policy, which outperforms all other policies under state transition assumptions that are consistent with currently available technologies. However, it should be understood that, as the state transition technology improves over time offering shorter and shorter transition times, the delay performance distinction will sometime become irrelevant, making the simplest policy (SSBC) by far the most appealing to implement.

Figure 12:
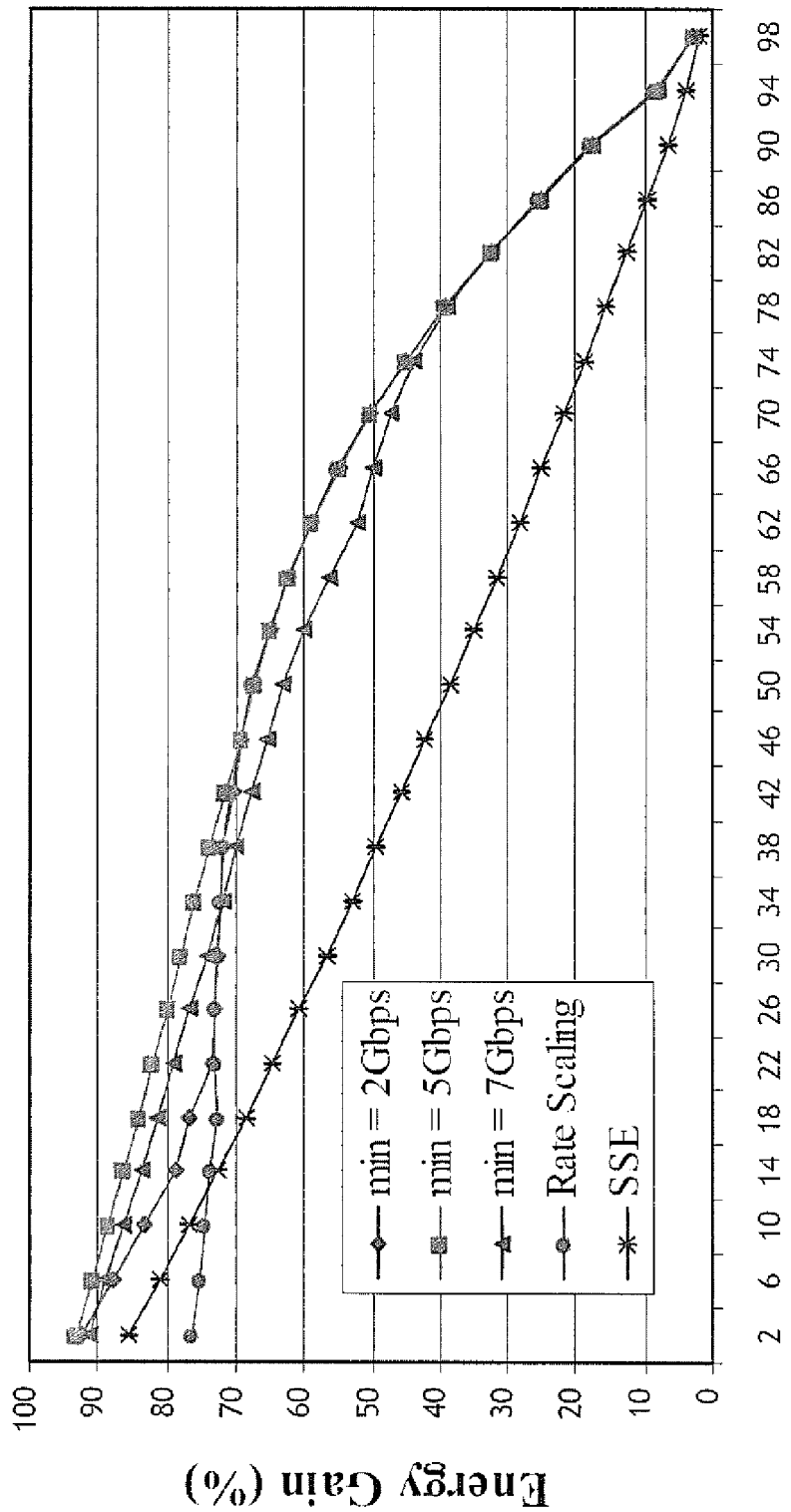
FIG. 12 is a performance plot showing the effects of a rate-adaptation scheme that combines rate-scaling with sleep-exploitation according to an embodiment of the invention.

Next is depicted the best minimum capacity to be made available in a rate-adaptation scheme that combines rate scaling with sleep-state exploitation. Referring to FIG. 12 there may be seen the energy-saving performance of the PPSBC rate-adaptation scheme with 2 Gbps, 5 Gbps, and 7 Gbps minimum capacity. The plot also includes the optimal rate-scaling scheme (PPSBC state-setting policy with 2 Gbps minimum capacity) and the sleep-state exploitation (SSE) scheme.

FIG. 12 confirms expectations in that:

The criterion of eq. (7) for setting the minimum non-null capacity proves optimal: in the lower portion of the load range the PPSBC policy with $r_{min}$=5 Gbps yields higher energy savings than the same policy with $r_{min}$=2 Gbps and $r_{min}$=7 Gbps.

The rate-adaptation scheme significantly outperforms the underlying rate-scaling scheme in the lower portion of the load range.

The rate-adaptation scheme outperforms the sleep-state exploitation scheme over the entire load range.

Figure 13:
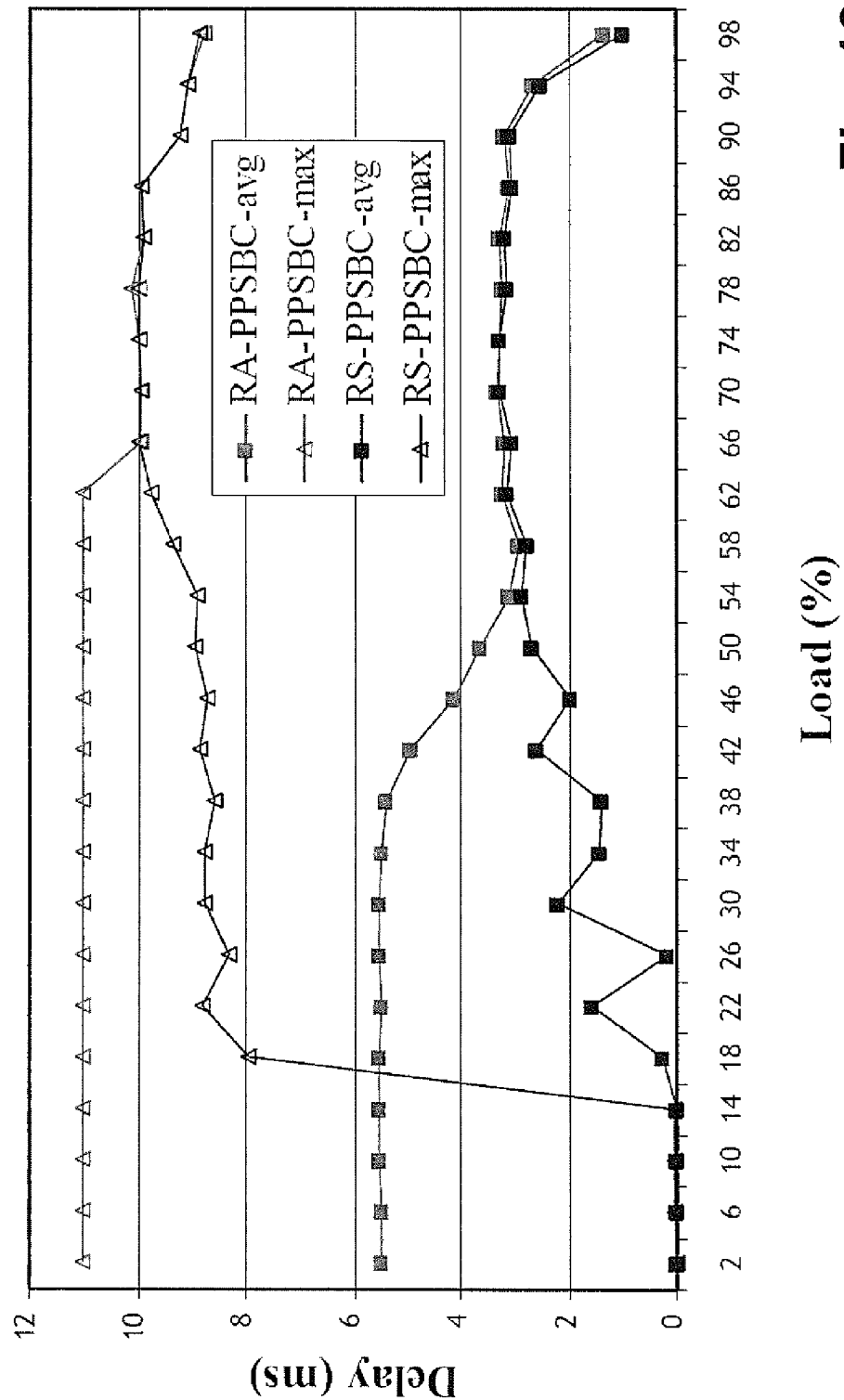
FIG. 13 is a comparison plot contrasting the delay performance of a rate-adaptation scheme to its underlying rate-scaling scheme according to an embodiment of the invention.

Finally, referring to FIG. 13 there may be seen a comparison between the delay performance of the PPSBC rate-adaptation scheme (RA-PPSBC) with the delay performance of the underlying rate-scaling scheme (RS-PPSBC).

The curves of FIG. 13 show that the two versions of PPSBC fully overlap for loads in excess of 5 Gbps, and that the rate-adaptation version complies with the delay bound of eq. (11) over the entire load range.

Summarizing, rate-adaptation schemes for improving the energy efficiency of packet networks have been addressed resulting in two contributions. First, it has been shown that by proper abstraction of network data paths it is possible to create the conditions for the incremental introduction of rate-adaptive devices in practical networks. Second, there has been defined a class of state-setting policies for rate adaptation schemes that enforce tight deterministic bounds on the extra delay that the schemes may cause to network traffic at every node where they are deployed. Within that class, there have been disclosed state-setting policies that effectively combine the best properties of sleep-state exploitation and rate-scaling schemes, demonstrating that the implementation of rate adaptation in practical network equipment can be improved over the rate adaptation methods existent in the prior art.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium or loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation." Numerous modifications, variations and adaptations may be made to the embodiment of the invention described above without departing from the scope of the invention, which is defined in the claims.

What is claimed is:

1. A method of establishing a rate-adaptation domain in a packet network having a plurality of connected network nodes not providing rate adaptation, the method comprising:
    partitioning said plurality of connected network nodes into subdomains, each subdomain having connecting interfaces with at least one other subdomain;
    identifying rate independent connecting interfaces among said connecting interfaces wherein integrity of data transfers through said connecting interfaces is preserved independent of operating states of the subdomains;
    identifying at least one subdomain for which all of the connecting interfaces are the rate independent connecting interfaces; and
    operating said at least one subdomain as a rate independent subdomain.

2. The method as claimed in claim 1, wherein said operating step comprises:
    receiving packets at an input interface from a domain immediately upstream to said rate-adaptation domain;
    establishing Quality-of-Service (QoS) requirements associated with said received packets;
    processing said received packets in a processing unit;
    dispatching the processed packets at an output interface to a domain immediately downstream from said rate-adaptation domain;
    establishing a set of state variables;
    controlling an operating state of said processing unit with said established set of state variables so as to control a rate at which packets are dispatched over said output interface;
    selecting the established set of state variables so as to satisfy a feasible departure curve and reduce energy consumption in said rate-adaptation domain.

3. The method as claimed in claim 2, wherein said packet processing step comprises at least one of parsing, modifying, and storing in a buffer queue.

4. The method as claimed in claim 3, further comprising:
    selecting state variables so as to place said processing unit in a sleep state.

5. The method as claimed in claim 3, further comprising:
    selecting state variables so as to adjust a clock rate of said processing unit.

6. The method as claimed in claim 2, wherein said feasible departure curve comprises an optimal departure curve.

7. The method of claim 1, further comprising:
    obtaining a feasible departure curve from a sequence of three operating states, wherein the three operating states have increasing processing capacity.

8. The method of claim 1, further comprising:
    obtaining a feasible departure curve from a sequence of two operating states, wherein a first operating state of the two operating states in the sequence has a null processing capacity.

9. The method of claim 1, further comprising:
    dividing operation of the rate-adaptation domain into a sequence of operating intervals of variable duration.

10. The method of claim 9, wherein the variable duration is never shorter than a minimum hold time.

11. The method of claim 1, further comprising:
comparing a traffic arrival rate to a threshold $r_T$.

12. The method of claim 11, further comprising:
using sleep-state exploitation when the traffic arrival rate is below the threshold $r_T$.

13. The method of claim 11, further comprising:
using rate scaling when the traffic arrival rate is above the threshold $r_T$.

14. A system having a rate-adaptation domain in a packet network, said packet network having a plurality of connected network nodes, the system comprising:
a plurality of subdomains, each subdomain being a partitioned subset of said plurality of connected network nodes, each subdomain having connecting interfaces with at least one other subdomain;
a set of rate independent connecting interfaces among said connecting interfaces wherein integrity of data transfers through said connecting interfaces is preserved independent of operating states of the subdomains;
at least one subdomain for which all of the connecting interfaces are the rate independent connecting interfaces; and
said at least one subdomain operating as a rate-adaptation subdomain.

15. The system as claimed in claim 14, wherein said at least one subdomain further comprises:
an input interface for receiving packets from a domain immediately upstream to said rate-adaptation domain, wherein a set of Quality-of-Service (QoS), requirements are associated with said received packets;
a processing unit for processing said received packets;
an output interface for dispatching packets to a domain immediately downstream from said rate-adaptation domain wherein state variables control an operating state of said processing unit, control a rate at which packets are dispatched over said output interface, and are selected so as to satisfy a feasible departure curve to reduce energy consumption in said rate-adaptation domain.

16. The system as claimed in claim 15, further comprising:
a buffer queue wherein said processing unit may store packets which have been at least one of a set of parsed and modified by said processing unit.

17. The system as claimed in claim 16, wherein said state variables control at least one of a group of setting said processing unit in a sleep state and adjusting the clock rate of said processing unit.

18. The system as claimed in claim 15, wherein said feasible departure curve comprises an optimal departure curve.

19. The system of claim 14, further comprising:
identifying each operating state by both a clock frequency value and a power supply voltage.

20. The system of claim 14, further comprising:
defining a function that associates a minimum power level with each available operating state.

* * * * *